Jan. 29, 1935.  J. G. WEBB  1,989,300
AUTOMOBILE TANK CAP
Filed Oct. 2, 1930
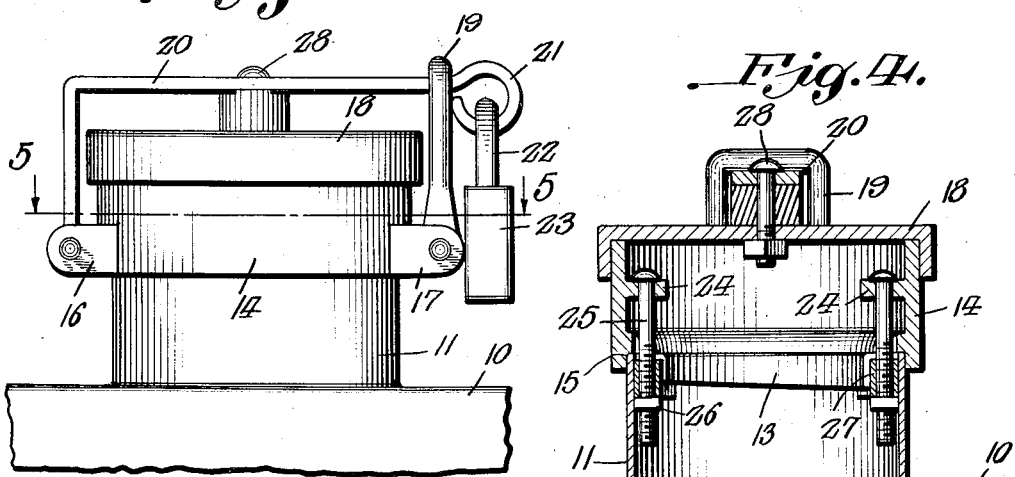
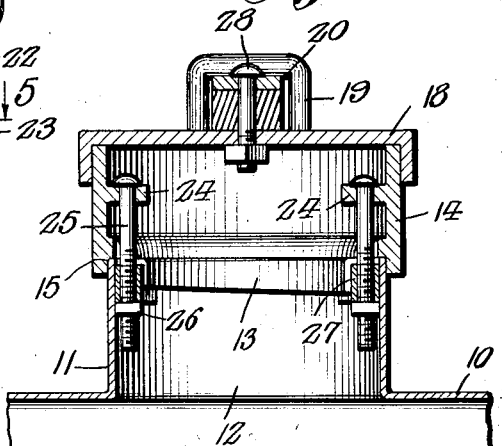
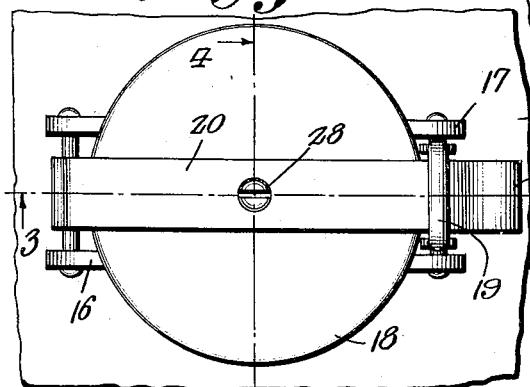
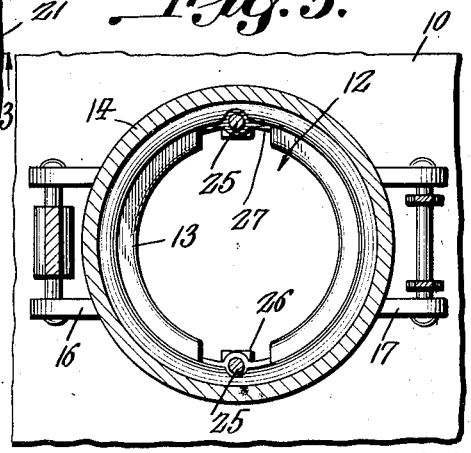
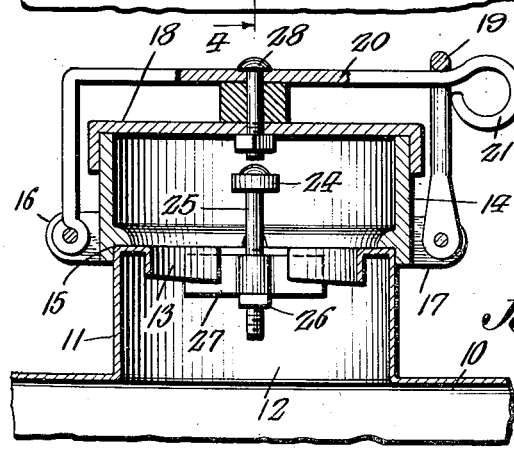
John G. Webb, Inventor Patented Jan. 29, 1935

1,989,300

UNITED STATES PATENT OFFICE 1,989,300

AUTOMOBILE TANK CAP

John G. Webb, Richmond, Va., assignor to Ivan H. Stant, Connersville, Ind.

Application October 2, 1930, Serial No. 485,987

6 Claims. (Cl. 220—24)

This invention relates to new and useful improvements in automobile accessories, and particularly to caps for automobile fuel tanks.

One object of the present invention is to provide a filling opening for an automobile fuel tank which will effectively prevent theft of the fuel from the tank.

Another object is to provide a device of this character which is readily attachable to the filling opening of the type of gasoline tanks now in general use on automobiles.

Other objects and advantages will be apparent from the following description when taken in connection with the accompanying drawing.

In the drawing:

Figure 1 is a side elevation of the invention in applied position.

Figure 2 is a top plan view of the same.

Figure 3 is a vertical transverse sectional view on the line 3—3 of Figure 2.

Figure 4 is a vertical transverse sectional view on the line 4—4 of Figure 2.

Figure 5 is a horizontal sectional view on the line 5—5 of Figure 1.

Referring particularly to the accompanying drawing, 10 represents a portion of an automobile gasoline tank, having the neck 11 surrounding and rising above the filling opening 12. On the inner face of this neck, adjacent the upper end, are the cam lugs 13, with which the lugs of the ordinary filling closure cap are adapted to engage to hold the cap in proper position. According to the present invention, the ordinary lug carrying cap is dispensed with and a device, forming the subject-matter of the present application, substituted therefor.

The present invention includes a tubular member 14, having in its lower edge a rabbet 15 which receives the upper edge of the neck, as clearly seen in the vertical sectional views. On diametrically opposite portions of the outer face of the tubular member 14 there are formed the pairs of spaced apertured lugs 16 and 17, to the former of which is pivotally connected the cap 18, while to the latter is pivotally connected the bail 19. The pivotal connection of the cap 18 includes a bar 20 which extends upwardly and then transversely of the cap, the free end being formed with an eye 21, over which the said bail 19 is adapted to engage to hold the cap in closed position. In the eye 21 is adapted to be engaged the shackle 22, of the padlock 23.

Projecting inwardly, from the inner face of the member 14, at diametrically opposite points, are the apertured lugs 24, and disposed vertically through each lug is a bolt 25, carrying a nut 26. On each bolt, between the lug 24 and the nut 26, is an arcuate strip 27, said strip extending circumferentially of the member 14, and having its upper face inclined longitudinally whereby to properly fit the lower inclined faces of the adjacent cam lugs 13. It will be noted that the shank of the bolt lies within the space between said lugs 13. It will also be noted that a face of the nut 26 bears against the inner face of the member 11, so as to permit the bolt to be rotated by means of a screwdriver, whereby to draw the strip 27 tightly against the cam lugs. Thus the tubular member 14 is firmly held in position on the neck 11. A bolt 28 is disposed through the intermediate portion of the strip or bar 20 and the center of the cap, whereby to hold the cap and bar together.

As practically all automobile gasoline tanks are provided with the cam lug locking and retaining means for the filling cap, the present device is readily attachable to the filling neck.

What is claimed is:

1. An attachment for the filling neck of a tank, which neck has internal circularly spaced lugs, comprising a tubular member having a lockable cap and being seated on and embracing the outer end of said neck, bolts loosely carried by the interior of said tubular member and arranged to be disposed between said lugs, and arcuate plates threadedly carried by the said bolts engaged beneath said lugs and arranged to be clamped thereagainst by said bolts.

2. In combination in a closure for a tank, a filler neck having a notched flange, a collar mounted on said neck, clamping means associated with said collar and said flange including a flange engaging element and means connecting said element to said collar, said element being greater in length than said notch, whereby the collar may be clamped to the neck upon the urging of said element against the under side of said flange adjacent the ends of said notch.

3. In combination in a closure for a tank, a filler neck having thereon a notched flange, a ring mounted on said neck, clamping means associated with said ring comprising a screw and bar threadedly connected together, said bar being greater in length than said notch and said screw arranged to be extended through said notch, whereby the ring may be clamped tightly on said neck when said bar is urged against the under side of said flange adjacent the ends of said notch.

4. In a closure structure for containers, a filler tube having a spaced transverse flange thereon with a notched opening therein, said flange having a bent-down section spaced from the filler neck wall thereby forming a recess, a collar mounted on said tube, clamping means associated with said collar and said flange including a member having a flange engaging portion movable relative to said collar and said flange and means connecting said member to said collar, said flange engaging portion adapted to register with and extend into said recess for engaging said flange whereby the tube and collar may be clamped together.

5. A tank inlet having a turned over mouth portion, a ring extending over the turned over portion, a block separable from the tank inlet and ring and insertable under the turned over portion and means for attaching the ring and the turned over mouth portion of the tank inlet to the block through said turned over portion.

6. A tank having an inlet with a turned over mouth portion, blocks under the turned over portion separable from said tank, a ring over the turned over portion, bolts attaching the ring to the block through the turned over portion, a cover enclosing the bolts and a lock for locking the cover to the ring.

JOHN G. WEBB.